Feb. 26, 1924.
C. L. NORTON
1,484,735
PROCESS OF MAKING REFRACTORY SHAPES
Original Filed May 5, 1922
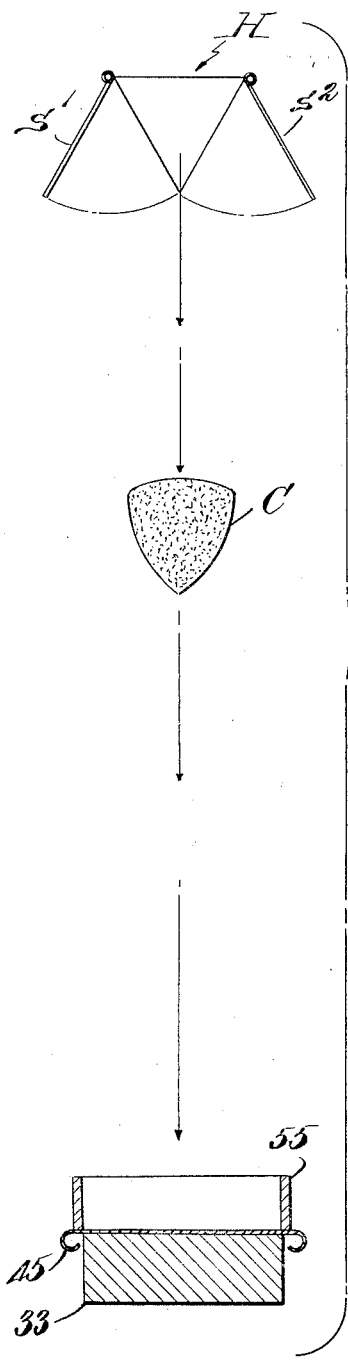
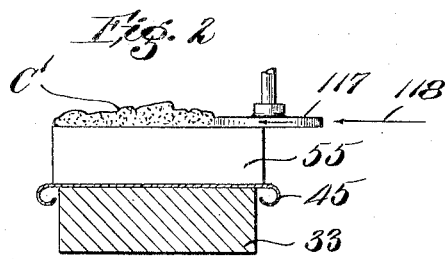
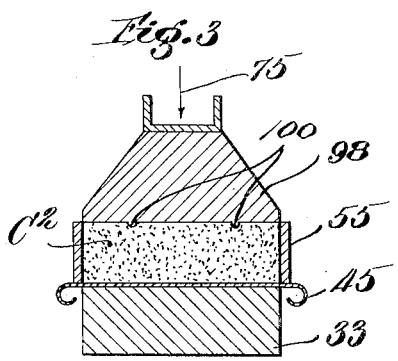
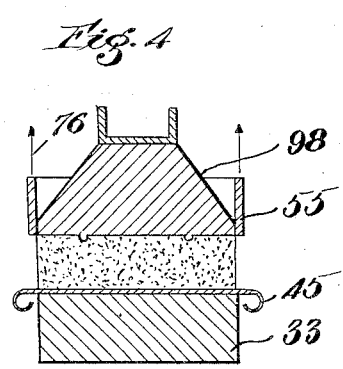
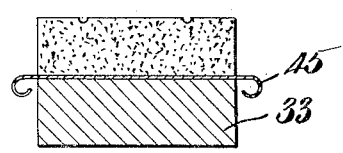
Inventor:
Charles L. Norton,
by Roberts, Roberts & Cushman,
Attys.

Patented Feb. 26, 1924.

1,484,735

UNITED STATES PATENT OFFICE.

CHARLES LADD NORTON, OF BOSTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

PROCESS OF MAKING REFRACTORY SHAPES.

Original application filed May 5, 1922, Serial No. 558,686. Divided and this application filed October 5, 1922. Serial No. 592,644.

*To all whom it may concern:*

Be it known that I, CHARLES LADD NORTON, citizen of the United States of America, and resident of Boston, in the county of Suffolk and State of Massachusetts, have invented new and useful Improvements in Processes of Making Refractory Shapes, of which the following is a specification.

This invention concerns the manufacture of plastic shapes and relates more particularly to a process of making such shapes from materials having the general physical characteristics of those commonly used in the manufacture of refractory, silica brick.

As set forth in my prior Patents Nos. 1,332,676, dated March 2, 1920, and 1,332,677, dated March 2, 1920, as well as in my copending applications Ser. No. 470,266, filed May 17, 1921 and Ser. No. 535,732, filed February 11, 1922, the commercial production of refractory, silica brick or shapes is attended with the greatest difficulty, although considered from a purely theoretical standpoint it might not appear that the various phases of manufacture would differ substantially from those common to the making of plastic shapes from the usual ceramic materials. The material employed, however, in making such refractory shapes differs essentially in its physical characteristics from clays such as are usually encountered in brick making or related ceramic arts. More specifically, the materials used in making silica brick consist of ground ganister rock with the addition of barely sufficient clay and water to enable the mass to retain its shape after moulding. The ground ganister is granular, the individual grains being exceedingly hard and of polygonal contour, thus presenting many salient angles, and such grains tend to interlock with adjacent grains to such an extent that no available degree of direct pressure is sufficient to force a mass of the material into a mould so as completely to fill the corners and angles of the latter. Moreover by reason of the non-uniform character of the material, and the relatively large size of many of its particles, any shaping operation involving cutting or slicing of the mass results in tearing away portions of the shape during the process of its preparation or the scoring of the surface thereof to such an extent as to make it worthless. Even after a shape has been moulded from this material it must be handled with the greatest care, as it is of such a friable character that the least shock, jar, or pressure will cause it to bulge or bag out so as to destroy its utility. The usual modes of moulding plastic materials involving pressure, extrusion, or cutting are thus precluded and an entirely different method of procedure is necessary. Prior to the invention of the process and apparatus disclosed in my aforementioned patents, the only known and practical mode of moulding plastic shapes from the above described material, or material having generally similar characteristics, was by a purely manual operation which at best was attended with uncertainty, and lack of uniformity and regularity of product. In accordance with such method the workman would grasp a mass of the material in his hands, and standing over the open top of the mould would hurl the mass into the latter. After the filling of the mould the material protruding from the top of the mould was "slicked off," a pallet or cover plate was placed upon the mould, and the mould was then inverted and lifted, thus leaving the moulded shape resting upon the pallet. The workman would then very carefully lift the pallet and convey it with the moulded shape thereon to the drying racks, the moulded shape being of too friable a nature to permit of its being handled except by means of the pallet.

The moulding of the shape in inverted position was believed necessary for two reasons: first, because the results of many experiments and tests seemed to indicate that if the pallet upon which the shape is afterward dried be used as the bottom element of the mould during the moulding operation, the extremely intimate contact of the moulded material with the surface of the metal pallet, occasioned by the unusual method of moulding employed, is such that after the drying of the moulded shape upon the pallet it cannot be separated from the pallet without injury, and second, because it is commonly desired to impress or stamp certain indicia upon the moulded shape during the process of making the same. The provision of such indicia is usually accomplished by providing the mould bottom with raised characters of desired form whereby each shape, as moulded, is impressed therewith, but even were it possible to mould the brick upon the pallet, it would manifestly be impracticable to furnish each pallet with an individual marking device.

For the above reasons it was deemed necessary, in devising the mechanical process and apparatus for moulding plastic shapes as disclosed in the aforesaid patents, to adhere to that practice which comprises filling the mould, placing a pallet thereon, and then inverting the mould to deposit the shape upon the pallet for drying. Thus both process and apparatus were complicated to a certain degree, although such process and apparatus are eminently suitable for the intended purpose and fill a valuable place in the art from a practical and commercial standpoint. The present invention therefore has for its principal object the provision of a simplified process useful in the manufacture of moulded shapes from materials, having the general characteristics of those referred to, and in particular to provide a process whereby such shapes may successfully be moulded upon the pallets upon which they are afterward dried, and if desired provided with the proper indicia during the moulding process.

The process herein described may if desired be carried out manually, or partly or wholly by appropriate mechanism, apparatus eminently suitable for the purpose being disclosed in my copending application, Ser. No. 558,686 filed May 5, 1922, of which this is a division.

The several steps comprised in the process are indicated more or less diagrammatically in the accompanying drawings in which,—

Fig. 1 is a diagrammatic elevation, partly in section, illustrating the filling of the mold;

Fig. 2 is a side elevation, partly in section, illustrating the slicking off of the surplus material from the top of the mold;

Fig. 3 is a vertical section through the mold showing the application of the push plate thereto;

Fig. 4 is a view similar to Fig. 3, but illustrating the operation of withdrawing the mold while retaining the molded shape in position by means of the push plate; and Fig. 5 is a vertical section showing the completed shape as resting upon the pallet plate.

As above pointed out, the high velocity with which the charge of material strikes the bottom of the mould is such as to drive the material of the charge into the pores of the ordinary metallic pallet plate when it is attempted to employ the latter as the mould bottom, producing a condition which appears to approach molecular adhesion between the metal and the charge, so that if the charge be allowed to dry while resting upon the metal plate it is substantially impossible to separate the dried material from the plate except in relatively small fragments. It has thus heretofore been considered impossible to use the pallet plate upon which the moulded shape is dried as the bottom of the mould when employing methods of filling the mold such as are necessary in making refractory silica shapes, but in accordance with the present process, the usual metallic pallet plate is first coated with some material which closes the pores of the metal, thus preventing the sticking of the moulded shape thereto. A thin coating of some substance having oily or oleaginous properties serves the desired purpose, a hydrocarbon compound such as crude petroleum or some of its derivatives being found to give the desired results.

The coated pallet is then placed upon a substantially horizontal supporting surface with its coated side up, and a mold-box, open at top and bottom, is positioned upon the pallet. An unconfined charge of the material to be moulded is now projected forcibly into the mould-box, either manually, or by mechanical means such for example as that disclosed in my Patent No. 1,332,677, the charge being of sufficient size completely to fill the mould-box and provide a mound of surplus material rising above the level of the top of the box. This surplus material is "slicked" or leveled off even with the top of the box by the action of a suitable instrumentality, and a "push plate" is laid upon the upper surface of the material in the box. This push plate fits loosely within the cavity of the mould-box and is preferably provided with suitable raised characters upon its under surface for stamping or impressing the desired indicia upon the surface of the plastic shape within the mould. The mould-box is now carefully lifted vertically a short distance while holding the push plate with the necessary pressure at its original level, the push plate thus serving to prevent upward movement of the moulded shape with the mould-box After movement of the box relatively to the moulded shape has once been initiated, it is unnecessary longer to retain the push plate upon the upper surface of the moulded shape, and the mould and push plate are now simultaneously lifted up and away from the moulded shape, leaving the latter standing upon the pallet plate and with the desired indicia impressed in its upper surface. The pallet plate with the shape thereon is now conveyed away to the drying racks, and after the shape has been properly dried preparatory to firing, it may readily be separated from the pallet plate, even though in filling the mould the charge of material be projected into the mould under the highest velocity practically attainable. While under some circumstances it may be desirable to renew the coating upon the pallets after the completion of each operation, it is found in practice that a single coating of the pallet usually suffices for several moulding operations.

The several steps of the process as above described may conveniently be carried into effect by the use of apparatus such as shown in the accompanying drawings. Referring to Fig. 1 the letter H indicates a hopper of substantially V-shape in cross section comprising the swinging side walls S', S² which are shown as open and having released the mold charge C which is falling toward the open-topped mold box 55. This mold box rests upon the pallet plate 45 whose upper surface has previously been coated with crude petroleum or similar material, and which is supported upon the anvil 33.

In Fig. 2 the mold box 55 is shown as having been filled to overflowing so that a portion of the mold charge projects upwardly at C' above its upper edge. A rotating slicker disk 117 is traveling across the top of the box in the direction of the arrow 118 to remove surplus material and to compact the material within the box.

In Fig. 3 the charge C² in the box is shown as having been slicked off and a push plate 98, which has been moved downwardly in the direction of the arrow 75, rests upon the upper surface of the charge C². The under surface of this push plate is provided with suitable raised indicia indicated at 100 which form desired impressions in the upper surface of the molded shape.

In Fig. 4 the push plate 98 is shown as still resting upon the upper surface of the molded shape while the mold box 55 is being raised vertically upward in the direction of the arrows 76.

In Fig. 5 the mold box and push plate have both been entirely removed leaving the molded shape with the impressed indicia in its upper surface resting upon the pallet plate 45 by means of which it may be lifted and carried away to any desired point.

The process above described permits the production of properly moulded and marked shapes at a substantially higher rate of speed than is possible where inversion of the moulded shape is a necessary step in the process, and results in less waste during the moulding process as well as in a product of superior quality.

While preferably performed in the order and with the several intermediate steps above enumerated, it is contemplated that the exact order may at times be varied or that certain of the named steps may be omitted or varied without departing from the spirit of the invention.

What I claim and desire to secure by Letters Patent of the United States is:

1. That process of making moulded shapes from granular material which comprises moulding such a shape upon a pallet plate by forcibly projecting, as by dropping, an unrestrained mass of such material in the form of a dense swarm of discrete particles into a mould-box resting upon such plate, and removing the mould-box to leave the moulded shape upon said plate.

2. That process of making moulded shapes which comprises projecting, as by dropping, a mass of substantially unconfined, discrete particles of granular material into a mould resting upon a pallet plate, the mass being greater than the capacity of the mould, removing such mould to leave the moulded shape upon the plate, and drying the shape while resting upon the plate.

3. That process of making moulded shapes from granular material, like ground ganister, which comprises preparing a pallet plate in such manner as to prevent adhesion of the material thereto, projecting, as by freely dropping, a mass of the material to be moulded into a mould box resting upon the prepared pallet plate, the mass of material being substantially greater than the capacity of the mould box, removing the mould box whereby to leave the moulded shape upon the pallet plate, and drying the shape upon the plate.

4. That process of making moulded shapes from granular material which comprises coating a pallet plate with heavy oil, moulding a shape upon said pallet plate by dropping an unrestrained mass of the material in the form of a dense swarm of discrete particles into a mould-box resting upon said plate and in quantity substantially greater than the capacity of such mould-box, drying such shape while resting upon the coated surface of the pallet plate, and removing the finished shape from the plate.

5. That process of making moulded shapes from ground ganister which comprises projecting, as by dropping, a single charge of material in the form of a dense swarm of discrete particles into a mould-box, open at top and bottom and resting upon a pallet plate, to fill such box to overflowing, slicking off surplus material level with the top of the box, lifting the box from the moulded shape leaving the later on the pallet plate, and drying the shape upon the pallet plate.

6. That process of making moulded shapes from ground ganister which comprises treating a pallet plate to prevent adhesion of the plastic material thereto, placing a mould upon said plate, forcibly projecting, as by dropping, an unrestrained single mass of the material in the form of a dense swarm of discrete particles into the mould to fill the latter to overflowing, removing surplus material from the top of the mould, removing the mould while holding the moulded shape down against the pallet plate, and drying the moulded shape while resting upon the pallet plate.

7. That process of making moulded shapes from refractory material such as ground ganister comprising placing a mould-box, open at top and bottom, upon a pallet plate, projecting a single charge of the material in the form of a dense unrestrained swarm of discrete particles into the mould-box to fill the latter to overflowing, initiating movement of the mould-box away from the pallet plate while restraining the moulded shape against movement, completing the separation of the mould-box from the moulded shape, and drying such shape upon the pallet plate.

8. That process of making moulded shapes from refractory material such as ground ganister comprising positioning a pallet plate, provided with a coating of a substance to which the material does not readily adhere, upon a substantially horizontal supporting surface, placing a mould box, open at top and bottom upon the coated surface of the pallet plate, projecting, as by freely dropping, an unrestrained mass of the material into the mould box in quantity sufficient to fill the latter to overflowing, applying downward pressure to the upper surface of the moulded shape in the box while initiating upward movement of the box relatively to the shape, removing such pressure while completing the separation of the box from the moulded shape, and drying the moulded shape upon the pallet plate.

9. That process of making moulded shapes from granular material which comprises moulding such shape upon a substantially smooth pallet plate, impressing the upper surface of such shape with desired indicia, and drying such shape upon said plate.

10. That process of making moulded shapes from refractory material comprising placing a mould-box open at top and bottom upon a pallet plate, projecting a charge of material into the mould-box to fill it to overflowing, smoothing the upper surface of the material in the box, impressing indicia in such surface, removing the box, and drying the moulded shape upon the pallet plate.

11. The process of making moulded shapes from refractory material which comprises forcibly projecting, as by dropping, an unrestrained mass of the material into a mould-box resting upon a pallet plate, moving the mould-box relatively to the moulded shape while holding the moulded shape in contact with the pallet plate, concomitantly impressing the moulded shape with desired indicia, and drying the moulded shape.

12. The process of making moulded shapes from refractory material comprising filling a mould-box with the plastic material, lifting said mould-box relatively to the moulded shape, and concomitantly impressing the upper surface of the shape with suitable indicia.

13. That process of making moulded shapes which comprises projecting a mass of plastic material into a mould resting upon a pallet plate, pressing a push plate having suitable indicia on its under surface into contact with the top of the moulded shape, lifting the mould while retaining the push plate in position, and thereafter removing the push plate.

14. That process of making moulded shapes comprising coating a pallet plate with an oleaginous material, placing a mould-box, open at top and bottom, on the coated surface of the plate, projecting, as by dropping, a single charge of refractory material such as ground ganister, in the form of an unrestrained and dense swarm of discrete particles, into the box in quantity to fill it to overflowing, slicking off the surplus material level with the top of the box, initiating upward movement of the box relatively to the pallet plate while concomitantly impressing the upper surface of the moulded shape with indicia and holding such shape downwardly against the pallet plate, completing the removal of the box without disturbing the moulded shape, drying the moulded shape upon the pallet plate, and removing the moulded shape when dry, from the pallet plate.

Signed by me at Boston, Massachusetts, this third day of October, 1922.

CHARLES LADD NORTON.